(12) United States Patent
Kyle et al.

(10) Patent No.: US 7,702,801 B1
(45) Date of Patent: Apr. 20, 2010

(54) DETERMINING LOGON STATUS IN A BROADBAND NETWORK SYSTEM AND AUTOMATICALLY RESTORING LOGON CONNECTIVITY

(75) Inventors: David Kyle, Austin, TX (US); Rodney Schmidt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2614 days.

(21) Appl. No.: 09/838,652

(22) Filed: Apr. 19, 2001

(51) Int. Cl.
*G06F 15/16* (2006.01)

(52) U.S. Cl. .................................................. 709/229

(58) Field of Classification Search ......... 709/200–207, 709/217–248; 370/402, 238, 351; 714/4; 379/355; 710/15
See application file for complete search history.

(56) References Cited

U.S. PATENT DOCUMENTS

| | | | | |
|---|---|---|---|---|
| 4,125,872 A * | 11/1978 | Maxwell | .................... | 379/40 |
| 5,123,089 A * | 6/1992 | Beilinski et al. | ............ | 709/237 |
| 5,185,860 A | 2/1993 | Wu | ............................ | 395/200 |
| 5,627,766 A | 5/1997 | Beaven | .................... | 364/551.01 |
| 5,710,885 A | 1/1998 | Bondi | .................... | 395/200.54 |
| 5,751,933 A | 5/1998 | Dev et al. | ............. | 395/182.02 |
| 5,826,242 A | 10/1998 | Montulli | ..................... | 705/27 |
| 5,948,108 A * | 9/1999 | Lu et al. | ........................ | 714/4 |
| 5,978,849 A * | 11/1999 | Khanna | ...................... | 709/227 |
| 6,064,653 A | 5/2000 | Farris | .......................... | 370/237 |
| 6,097,808 A * | 8/2000 | Chang | .................. | 379/355.05 |
| 6,108,704 A * | 8/2000 | Hutton et al. | .............. | 709/227 |
| 6,167,450 A | 12/2000 | Angwin et al. | ............. | 709/227 |
| 6,216,163 B1 * | 4/2001 | Bharali et al. | ............. | 709/227 |
| 6,226,684 B1 * | 5/2001 | Sung et al. | .................. | 709/238 |
| 6,229,787 B1 * | 5/2001 | Byrne | ........................ | 370/218 |
| 6,295,557 B1 * | 9/2001 | Foss et al. | .................... | 709/224 |
| 6,308,221 B1 * | 10/2001 | Perlman et al. | ............. | 709/241 |
| 6,317,838 B1 * | 11/2001 | Baize | ......................... | 713/201 |
| 6,338,054 B1 * | 1/2002 | Kitamura | ....................... | 707/1 |
| 6,341,312 B1 * | 1/2002 | French et al. | ............... | 709/227 |
| 6,360,267 B1 * | 3/2002 | Kakiuchi et al. | ............. | 709/227 |
| 6,397,253 B1 * | 5/2002 | Quinlan et al. | ............. | 709/227 |
| 6,408,389 B2 * | 6/2002 | Grawrock et al. | ........... | 713/183 |
| 6,470,453 B1 * | 10/2002 | Vilhuber | ..................... | 713/201 |
| 6,598,081 B1 * | 7/2003 | Coile et al. | ................. | 709/227 |
| 6,725,290 B1 * | 4/2004 | Glover et al. | ................. | 710/15 |
| 6,766,373 B1 * | 7/2004 | Beadle et al. | ............... | 709/227 |
| 6,792,457 B1 * | 9/2004 | Zhang et al. | ................. | 709/224 |

(Continued)

FOREIGN PATENT DOCUMENTS

GB  2333671  *  7/1999

*Primary Examiner*—Asad M Nawaz
(74) *Attorney, Agent, or Firm*—Meyertons, Hood, Kivlin, Kowert & Goetzel, P.C.

(57) ABSTRACT

A system, computer program product and method for automatically restoring logon connectivity in a broadband network system. Upon establishing a connection between a client and Internet gateway (INTERNET GATEWAY), the status of the connection, i.e., connected or disconnected, may be checked by issuing a request to an INTERNET GATEWAY utilizing a protocol that is normally blocked when the client is disconnected. By issuing a request utilizing a protocol that is normally blocked when the client is disconnected, the status of the connection may be determined by whether the request may be serviced. If the request cannot be serviced, then a subsequent connection may be established automatically by terminating the logon procedure associated with the preceding connection, e.g., initial connection, and executing the logon procedure associated with the subsequent connection.

39 Claims, 5 Drawing Sheets

U.S. PATENT DOCUMENTS

| | | | |
|---|---|---|---|
| 6,934,952 B2 * | 8/2005 | Sarkar et al. | 719/310 |
| 7,027,406 B1 * | 4/2006 | Shabtay et al. | 370/252 |
| 7,079,849 B2 * | 7/2006 | Hanson | 455/456.1 |
| 7,093,020 B1 * | 8/2006 | McCarty et al. | 709/229 |
| 7,386,610 B1 * | 6/2008 | Vekiarides | 709/224 |
| 7,426,530 B1 * | 9/2008 | Rosko et al. | 709/201 |
| 7,493,402 B2 * | 2/2009 | McCarty et al. | 709/229 |
| 2002/0032853 A1 * | 3/2002 | Preston et al. | 713/151 |
| 2002/0072974 A1 * | 6/2002 | Pugliese et al. | 705/14 |
| 2002/0138728 A1 * | 9/2002 | Parfenov et al. | 713/170 |
| 2002/0146129 A1 * | 10/2002 | Kaplan | 380/270 |
| 2002/0147807 A1 * | 10/2002 | Raguseo | 709/224 |
| 2002/0147856 A1 * | 10/2002 | Sarkar et al. | 709/313 |
| 2003/0083067 A1 * | 5/2003 | Hanson | 455/433 |

* cited by examiner

DETERMINING LOGON STATUS IN A BROADBAND NETWORK SYSTEM AND AUTOMATICALLY RESTORING LOGON CONNECTIVITY

TECHNICAL FIELD

The present invention relates to the field of broadband network systems, and more particularly to automatically restoring logon connectivity in a broadband network system.

BACKGROUND INFORMATION

A broadband network system, e.g., Digital Subscriber Line (DSL) system, cable system, provides subscribers with many benefits, including greater bandwidth, more efficient use of bandwidth and the ability to integrate voice, data and video communications.

A broadband network system may comprise a host machine, e.g., server computer on the Internet commonly referred to as web server, connected to one or more computers commonly referred to as clients via the Internet. The Internet may refer to a network of computers. Users of clients, commonly referred to as subscribers, may be connected to the Internet through an Internet gateway, e.g., Internet Service Provider (ISP). An Internet gateway may provide access to the Internet for a monthly fee. Typically, a subscriber accesses the Internet through the Internet gateway by logging onto the network of the Internet gateway using an identifier, e.g., jdoe, and a secret password. Once a connection is established between the Internet gateway and the subscriber, the subscriber may access the Internet and "browse", i.e., navigate around, the World Wide Web ("WWW") by utilizing a suitable web browser, e.g., Netscape™, Internet Explorer™. A web browser allows the subscriber to specify or search for a web page on the WWW and subsequently retrieve and display web pages on the subscriber's computer screen.

Unfortunately, the connection between an Internet gateway and a subscriber may be disconnected due a time-out or an error. Generally, there is no warning to the subscriber other than an unidentified lost connection to the Internet gateway. In a shared network environment where a plurality of subscribers are connected to an Internet gateway through a router, e.g., Network Address Translation (NAT) router, the loss of connectivity to an Internet gateway results in the loss of service to all subscribers connected to the router. The connection to the Internet gateway remains lost until a new connection to the Internet gateway is manually made which may result in subscribers being unconnected to the Internet for hours. Typically, a new connection to the Internet gateway is manually made by re-logging onto the network of the Internet gateway at the router.

It would therefore be desirable to restore lost connectivity to an Internet gateway automatically instead of manually re-logging onto the network of the Internet gateway thereby diminishing the amount of time a subscriber is unconnected to the Internet.

SUMMARY

The problems outlined above may at least in part be solved in some embodiments by a client or router issuing a request to an Internet gateway, e.g., Internet Service Provider (ISP), utilizing a protocol, e.g., HyperText Transport Protocol (HTTP), telnet protocol, file transfer protocol, that is normally blocked when the client is disconnected to determine whether the connection between a client and the Internet gateway has been disconnected. If the request cannot be serviced, then a subsequent connection may be established automatically by terminating the logon procedure associated with the preceding connection, e.g., initial connection, and executing the logon procedure associated with the subsequent connection.

In one embodiment of the present invention, a method for automatically restoring logon connectivity in a network system may comprise the step of establishing an initial connection between a client and an Internet gateway. Upon establishing an initial connection, the status of the initial connection, i.e., connected or disconnected, may be checked by issuing a request to an Internet gateway utilizing a protocol that is normally blocked when the client is disconnected. By issuing a request utilizing a protocol that is normally blocked when the client is disconnected, the status of the connection may be determined by whether the request may be serviced. If the request can be serviced, a first period of time, e.g., 300 seconds, may transpire before the status of the established connection may be checked. If the request cannot be serviced, then a subsequent connection may be established automatically by terminating the logon procedure associated with the preceding connection, e.g., initial connection, and executing the logon procedure associated with the subsequent connection. Upon attempting to establish a subsequent connection, a second period of time, e.g., 60 seconds, may transpire before the status of the attempted subsequent connection is checked. The second period of time may be less than the first period of time in order to check the status of an attempted connection in less time than in checking the status of a previously established connection. As stated above, a connection may be checked by issuing a request to the Internet gateway utilizing a protocol that is normally blocked when the client is disconnected. If the request can be serviced then a first period of time, e.g., 300 seconds, may transpire before the status of the established connection is checked. If the request cannot be serviced, then an attempt to establish a subsequent connection may be established automatically.

In one embodiment of the present invention, one or more clients may be directly connected to the Internet gateway. Subsequently, the steps in the above method may be executed by a client. In another embodiment of the present invention, one or more clients may be coupled to a router configured to forward packets of data from the one or more clients to Internet gateway. In this embodiment, the router may be configured to execute the steps in the above stated method.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a system, computer program product and method for automatically restoring logon connectivity. In one embodiment of the present invention, upon establishing a connection between a client and an Internet gateway, e.g., Internet Service Provider (ISP), the status of the connection, i.e., connected or disconnected, may be checked by issuing a request to the Internet gateway utilizing a protocol that is normally blocked when the client is disconnected. By issuing a request utilizing a protocol that is normally blocked when the client is disconnected, the status of the connection may be determined by whether the request may be serviced. If the request cannot be serviced, then a subsequent connection may be established automatically by terminating the logon procedure associated with the preceding connection, e.g., initial connection, and executing the logon procedure associated with the subsequent connection. It is noted that even though the following discusses the present invention in connection with a broadband network system, the present invention may be implemented in any network system where logon connectivity may be restored by issuing a request utilizing a protocol that is normally blocked when the client is disconnected.

Figure 1:
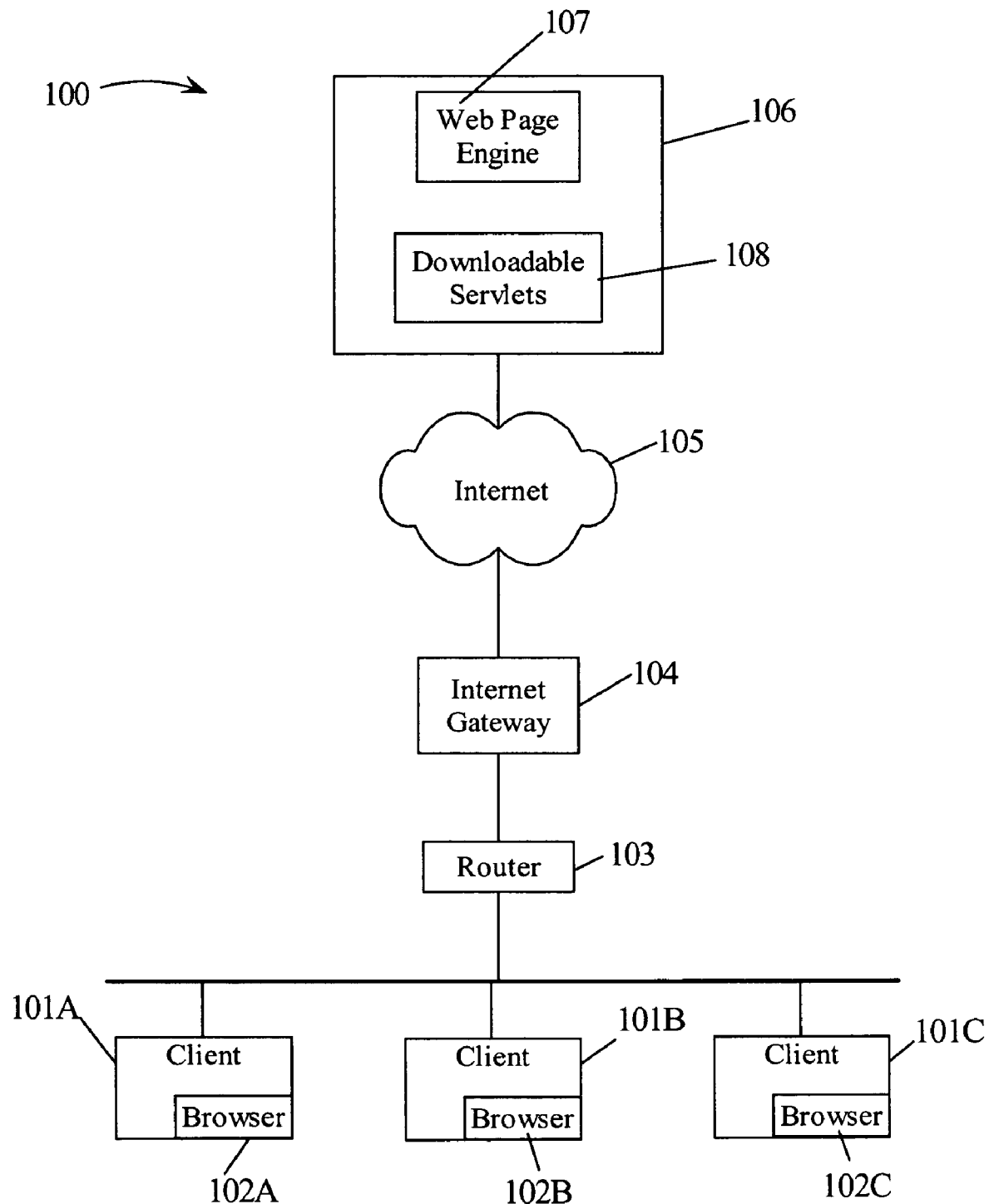
FIG. 1 illustrates an embodiment of a broadband network system configured in accordance with the present invention.

FIG. 1—Network System

FIG. 1 illustrates one embodiment of the present invention of a broadband network system 100. Network system 100 may comprise one or more clients 101A-C connected to a web server 106 via the Internet 105 by establishing a connection to an Internet gateway 104, e.g., ISP. The Internet 105 may refer to a network of computers. In one embodiment, network system 100 may comprise one or more clients 101 directly coupled to Internet gateway 104. In another embodiment, network system 100 may further comprise a router 103, e.g., Network Address Translation (NAT) router, coupled to one or more clients 101A-C configured to forward packets of data from clients 101A-C to Internet gateway 104. Clients 101A-C may collectively or individually be referred to as clients 101 or client 101, respectively. It is noted that network system 100 may comprise any number of clients 101 as well as any number of routers 103, Internet gateway's 104 and web servers 106 and that FIG. 1 is illustrative. It is further noted that the connection between clients 101 and Internet gateway 104 may be any medium type, e.g., wireless, wired. It is further noted that client 101 may be any type of device, e.g., wireless, Personal Digital Assistant (PDA), cell phone, personal computer system, workstation, Internet appliance, configured with the capability of connecting with Internet gateway 104 and consequently communicating with web server 106.

Referring to FIG. 1, each client 101A-C may comprise a web browser 102A-C, respectively, which may be configured for communicating with the Internet 105 and for reading and executing web pages. Browsers 102A-C may collectively or individually be referred to as browsers 102 or browser 102, respectively. While the illustrated client engine is a web browser 102, those skilled in the art will recognize that other client engines may be used in accordance with the present invention.

Web server 106 may comprise a web page engine 107 for maintaining and providing access to an Internet web page which is enabled to forward static web pages as well as web pages dynamically created by servlets 108 to web browser 102 of client 101. A servlet may be a program typically written in the Java object-oriented programming language. Servlets 108 typically are server-side applications (often implemented using the Java™ programming language) that may be used to create web pages that contain dynamic or run-time information. Server 106 then delivers the page to client 101, for example via the Internet 105.

As stated in the Background Information section, clients 101 may be connected to the Internet 105 through Internet gateway 104. Internet gateway 104 provides the network interface and computer service functions which enables the user of client 101, i.e., subscriber, to establish a connection to the Internet 105, and request and receive information from Internet World Wide Web (WWW) sites. Unfortunately, the connection between Internet gateway 104 and a subscriber may be disconnected due to a time-out or an error. Generally, there is no warning to the subscriber other than an unidentified lost connection to Internet gateway 104. In a shared network environment where a plurality of clients 101 are connected to Internet gateway 104 through router 103, the loss of connectivity to Internet gateway 104 results in the loss of service to all subscribers connected to router 103. The connection to Internet gateway 104 remains lost until a new connection to Internet gateway 104 is manually made which may result in subscribers being unconnected to the Internet 105 for hours. Typically, a new connection to Internet gateway 104 is manually made by re-logging onto the network of Internet gateway 104 at router 103. It would therefore be desirable to restore lost connectivity to Internet gateway 104 automatically instead of manually re-logging onto the network of Internet gateway 104 thereby diminishing the amount of time a subscriber is unconnected to the Internet 105.

Figure 2:
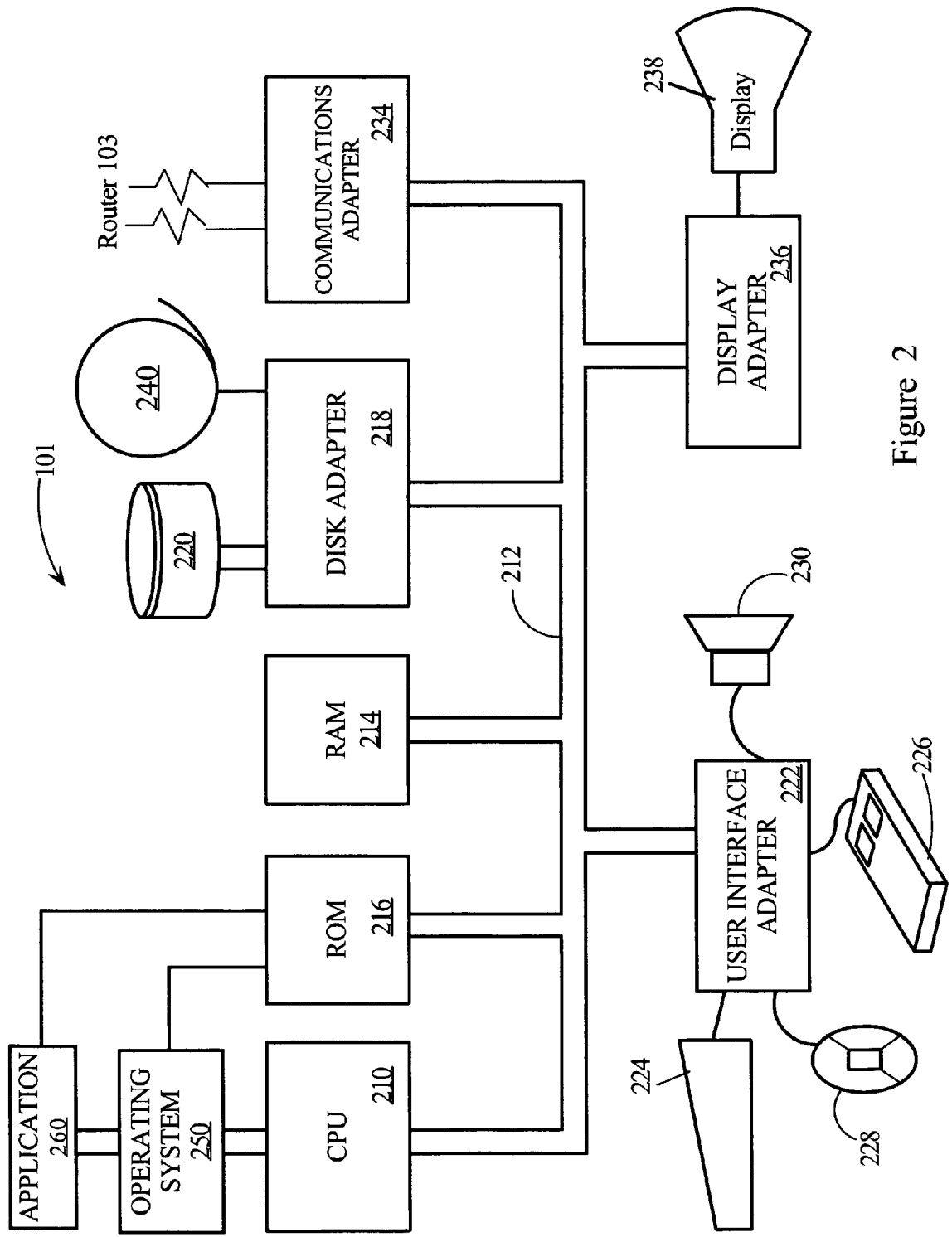
FIG. 2 illustrates an embodiment of a router configured in accordance with the present invention.
Figure 3:
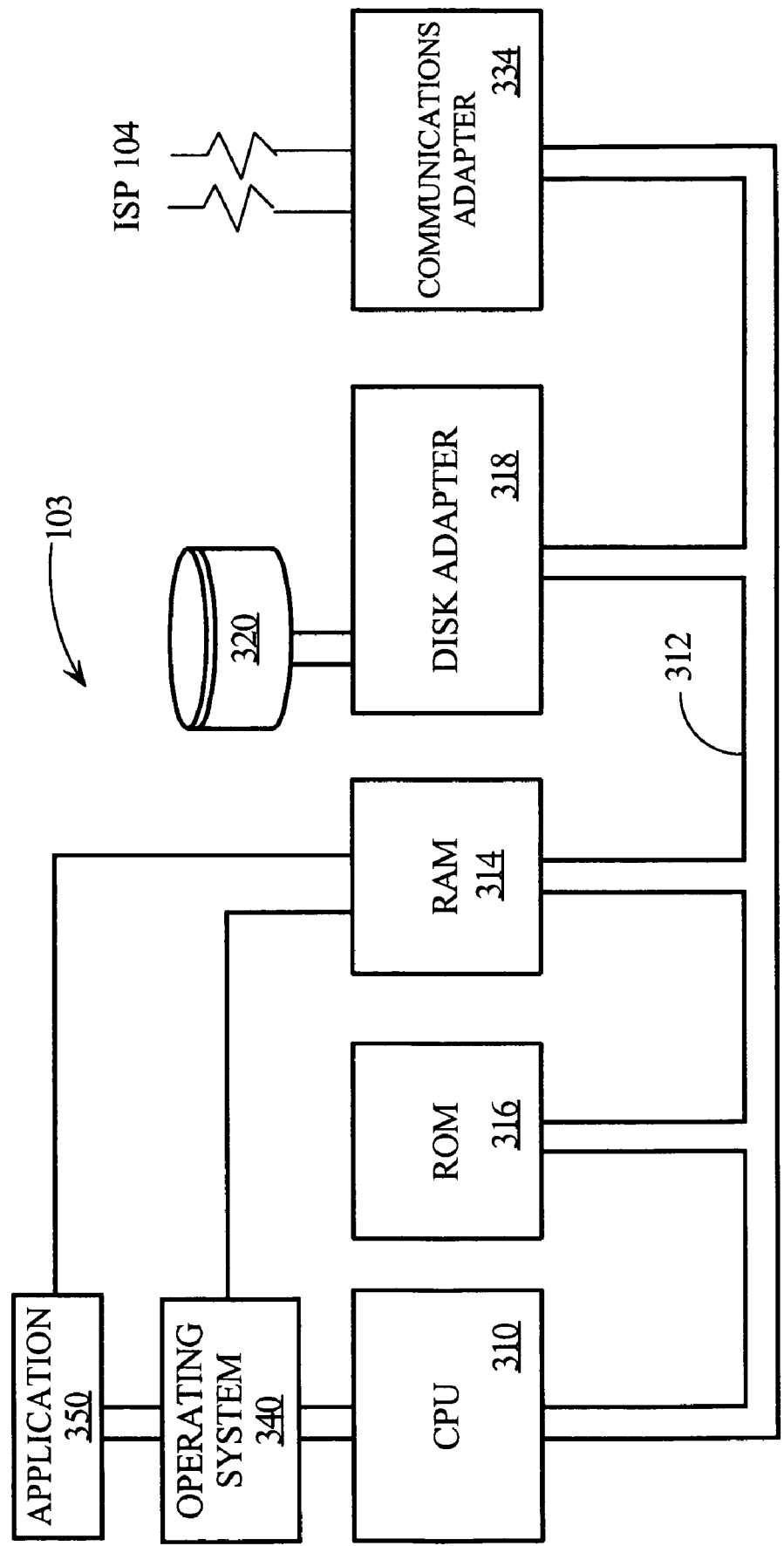
FIG. 3 illustrates an embodiment of a client configured in accordance with the present invention.

In the embodiment of network system 100 where one or more clients 101 are directly connected to Internet gateway 104, client 101 as illustrated in FIG. 2 may be configured to automatically re-log onto the network of Internet gateway 104 upon a loss of a connection between Internet gateway 104 and client 101 as will be explained in greater detail in the discussion of FIG. 4. In the embodiment of network system where network system 100 is a shared network environment as illustrated in FIG. 1, router 103 as illustrated in FIG. 3 may be configured to automatically re-log onto the network of Internet gateway 104 upon a loss of a connection between Internet gateway 104 and clients 101 as will be explained in greater detail in the discussion of FIG. 4.

FIG. 2—Hardware Configuration of Client

FIG. 2 illustrates a typical hardware configuration of client 101 which is representative of a hardware environment for practicing the present invention. Client 101 has a central processing unit (CPU) 210 coupled to various other components by system bus 212. An operating system 250 runs on CPU 210 and provides control and coordinates the function of the various components of FIG. 2. Application 260, e.g., program for automatically re-logging onto Internet gateway 104 to restore lost connectivity, as described in FIG. 4, runs in conjunction with operating system 250 which implements the various functions to be performed by application 260. Read only memory (ROM) 216 is coupled to system bus 212 and includes a basic input/output system ("BIOS") that controls certain basic functions of client 101. Random access memory (RAM) 214, I/O adapter 218, and communications adapter 234 are also coupled to system bus 212. It should be noted that software components including operating system 250 and application 260 are loaded into RAM 214 which is the computer system's main memory. I/O adapter 218 may be a small computer system interface ("SCSI") adapter that communicates with disk units 220, e.g., disk drive, and tape drives 240.

Figure 4:
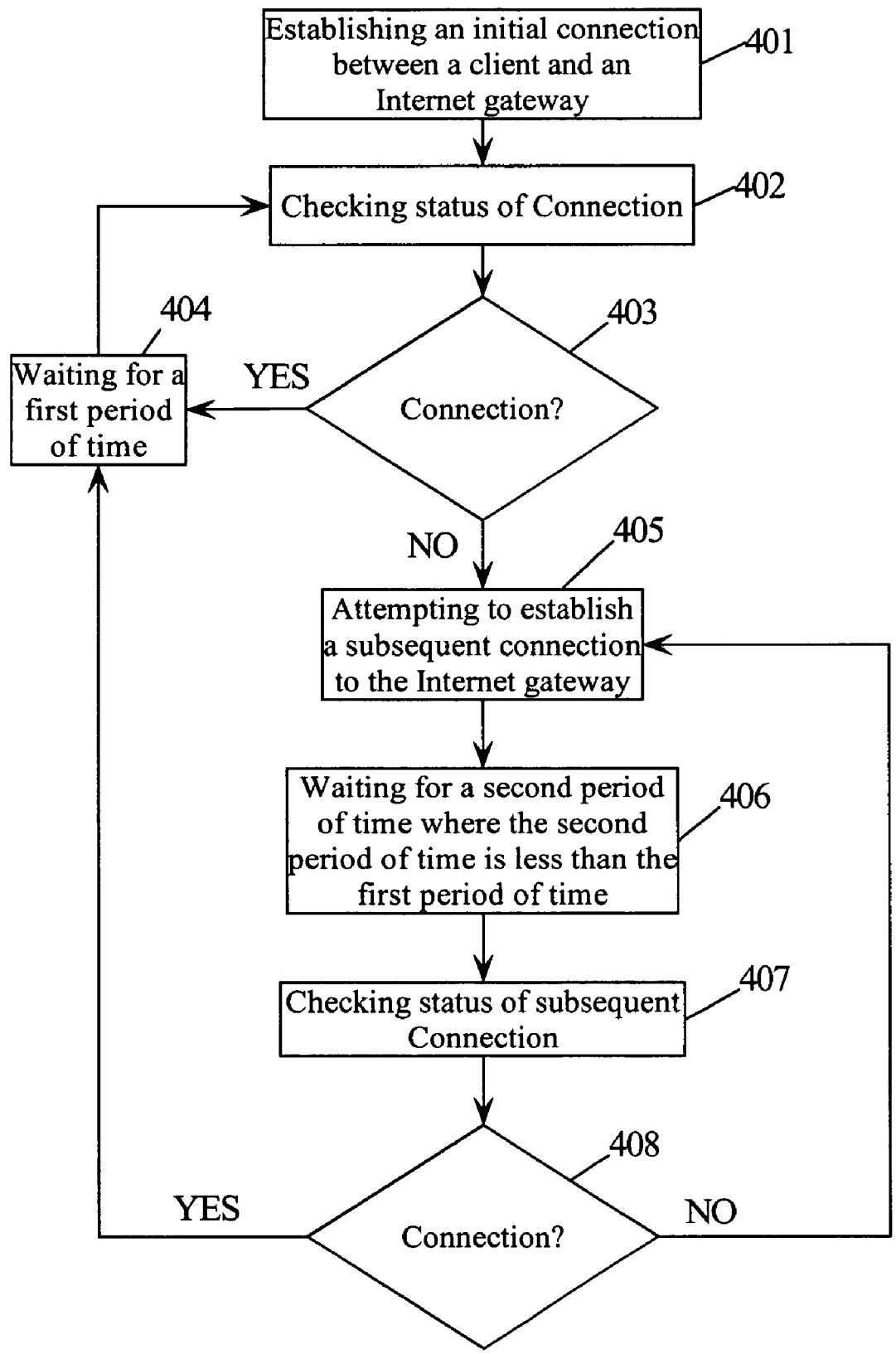
FIG. 4 is a flowchart of a method for automatically restoring logon connectivity.

It is noted that the program of the present invention that automatically re-logs client 101 onto Internet gateway 104 to restore lost connectivity, as described in FIG. 4, may reside in disk unit 220 or in application 260. Communications adapter 234 interconnects bus 212 with router 103 enabling client 101 to communicate with web server 106. Input/Output devices are also connected to system bus 212 via a user interface adapter 222 and display adapter 236. Keyboard 224, trackball 228, mouse 226 and speaker 230 are all interconnected to bus 212 through user interface adapter 222. Event data may be input to client 101 through any of these devices. A display monitor 238 is connected to system bus 212 by display adapter 236. In this manner, a user is capable of inputting to client 101 through keyboard 224, trackball 228 or mouse 226 and receiving output from client 101 via display 238 or speaker 230.

Implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

FIG. 3—Router

FIG. 3 illustrates an embodiment of the present invention of router 103. Referring to FIG. 3, router 103 may comprise a central processing unit (CPU) 310 coupled to various other components by system bus 312. An operating system 340 runs on CPU 310 and provides control and coordinates the function of the various components of FIG. 3. Application 350, e.g., program for automatically re-logging onto Internet gateway 104 to restore lost connectivity, as described in FIG. 4, runs in conjunction with operating system 340 which implements the various functions to be performed by application 350. Read only memory (ROM) 316 is coupled to system bus 312 and includes a basic input/output system ("BIOS") that controls certain basic functions of router 103. Random access memory (RAM) 314, disk adapter 318 and communications adapter 334 are also coupled to system bus 312. It should be noted that software components including operating system 340 and application 350 are loaded into RAM 314 which is the computer system's main memory. Disk adapter 318 may be a small computer system interface ("SCSI") adapter that communicates with disk units 320, e.g., disk drive. It is noted that the program of the present invention that automatically re-logs one or more subscribers onto Internet gateway 104 to restore lost connectivity, as described in FIG. 4, may reside in disk unit 320 or in application 350. Communications adapter 334 interconnects bus 312 with Internet gateway 104 enabling router 103 to communicate with Internet gateway 104.

Implementations of the invention include implementations as a computer system programmed to execute the method or methods described herein, and as a computer program product. According to the computer system implementations, sets of instructions for executing the method or methods are resident in the random access memory 314 of one or more computer systems configured generally as described above. Until required by router 103, the set of instructions may be stored as a computer program product in another computer memory, for example, in disk drive 320 (which may include a removable memory such as an optical disk or floppy disk for eventual use in disk drive 320). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 4—Method for Automatically Re-Logging onto Internet Gateway to Restore Lost Connectivity FIG. 4 is a flowchart of one embodiment of the present invention of a method 400 for automatically restoring logon connectivity between a client 101 and Internet gateway 104, e.g., ISP. As stated in the Background Information section, the connection between an Internet gateway and subscribers (computer users of clients 101) may be disconnected due a time-out or an error. Generally, there is no warning to the subscriber other than an unidentified lost connection to the Internet gateway. In a shared network environment where a plurality of subscribers are connected to an Internet gateway through a router, e.g., Network Address Translation (NAT) router, the loss of connectivity to an Internet gateway results in the loss of service to all subscribers connected to the router. The connection to the Internet gateway remains lost until a new connection to the Internet gateway is manually made which may result in subscribers being unconnected to the Internet for hours. Typically, a new connection to the Internet gateway is manually made by re-logging onto the network of the Internet gateway at the router. It would therefore be desirable to restore lost connectivity to an Internet gateway automatically instead of manually re-logging onto the network of the Internet gateway thereby diminishing the amount of time a subscriber is unconnected to the Internet. Method 400 is a method for automatically restoring lost connectivity to an Internet gateway. The following illustrates an exemplary script that when executed by client 101 or router 103 performs the steps of method 400 as described below.

start LOGON.EXE logevent –S i "Broadband is re-logged on"

:START now httpping www.anysite.com 80 if %ERRORLEVEL% EQU 0 goto :SLEEP logevent –S w "Broadband is logged off"

:RESTART kill LOGON.EXE start LOGON.EXE sleep 60 now httpping www.anysite.com 80 if %ERRORLEVEL% NEQ 0 goto :RESTART logevent –S i "Broadband is re-logged on"

:SLEEP sleep 300 goto :START

In step 401 an initial connection between client 101 and Internet gateway 104 may be established by executing an initial logon procedure as illustrated by the line "start LOGON.EXE" in the script above. In the embodiment of network system 100 where one or more clients 101 are directly connected to Internet gateway 104, client 101 may be configured to execute the initial logon procedure to establish an initial connection between client 101 and Internet gateway 104. In the embodiment of network system 100 where network system 100 is a shared network environment as illustrated in FIG. 1, router 103 may be configured to execute the initial logon procedure to establish an initial connection between router 103 and Internet gateway 104. When router 103 establishes a connection between router 103 and Internet gateway 104, the other clients 101 connected to router 103 are then connected to Internet gateway 104 as well. Upon executing the initial logon procedure, the initial logon procedure may be logged into a file storing a list of the events transpired as illustrated by the line "logevent –S i 'Broadband is re-logged on'" in the script above.

In step 402, the status of the connection between client 101 and Internet gateway 104, i.e., connected or disconnected, is checked by issuing a request, e.g., http://www.amd.com, to Internet gateway 104 to access web server 106 utilizing a protocol, e.g., HyperText Transport Protocol (HTTP), telnet protocol, file transfer protocol, mail protocol, that is normally blocked when client 101 is logged off. An example of the issuance of a request to access web server 106 is illustrated by the line "httpping www.anysite.com 80" in the script above.

A determination may be made in step 403 as to whether or not client 101 is connected or disconnected to Internet gateway 104. By issuing a request utilizing a protocol that is normally blocked when client 101 is logged off, the status of the initial connection, i.e., connected or disconnected, may be determined based on whether web server 106 may be accessed. If client 101 is logged off, i.e., client 101 is disconnected to Internet gateway 104, then the request to access web server 106 utilizing a protocol that is normally blocked when client 101 is logged off will be denied. If client 101 is logged on, i.e., client 101 is connected to Internet gateway 104, then the request to access web server 106 utilizing a protocol that is normally blocked when client 101 is logged off will be accepted. In the embodiment of network system 100 where one or more clients 101 are directly connected to Internet gateway 104, client 101 may be configured to issue a request, e.g., http://www.amd.com, to Internet gateway 104 to access web server 106 utilizing a protocol, e.g., HyperText Transport Protocol (HTTP), telnet protocol, file transfer protocol, mail protocol, that is normally blocked when client 101 is logged off. In the embodiment of network system 100 where network system 100 is a shared network environment as illustrated in FIG. 1, router 103 may be configured to issue a request, e.g., http://www.amd.com, to Internet gateway 104 to access web server 106 utilizing a protocol, e.g., HyperText Transport Protocol (HTTP), telnet protocol, file transfer protocol, mail protocol, that is normally blocked when client 101 is logged off. Router 103 may then be able to determine whether the one or more clients 101 connected to router 103 are connected or disconnected to Internet gateway 104.

Referring to step 403, if there is a connection between client 101 and Internet gateway 104 then method 400 may wait for a first period of time, e.g., 300 seconds, in step 404 before checking the status of the connection in step 402 as illustrated by the lines "if %ERRORLEVEL% EQU 0 goto :SLEEP

:SLEEP sleep 300"

in the script above.

Referring to step 403, if there is not a connection between client 101 and Internet gateway 104, i.e., client 101 has become disconnected to Internet gateway 104, then an attempt to establish a subsequent connection between client 101 and Internet gateway 104 may be established automatically in step 405. The disconnection may be logged into a file storing a list of the events transpired as illustrated by the line "logevent –S w 'Broadband is logged off'" in the script above.

Figure 5:
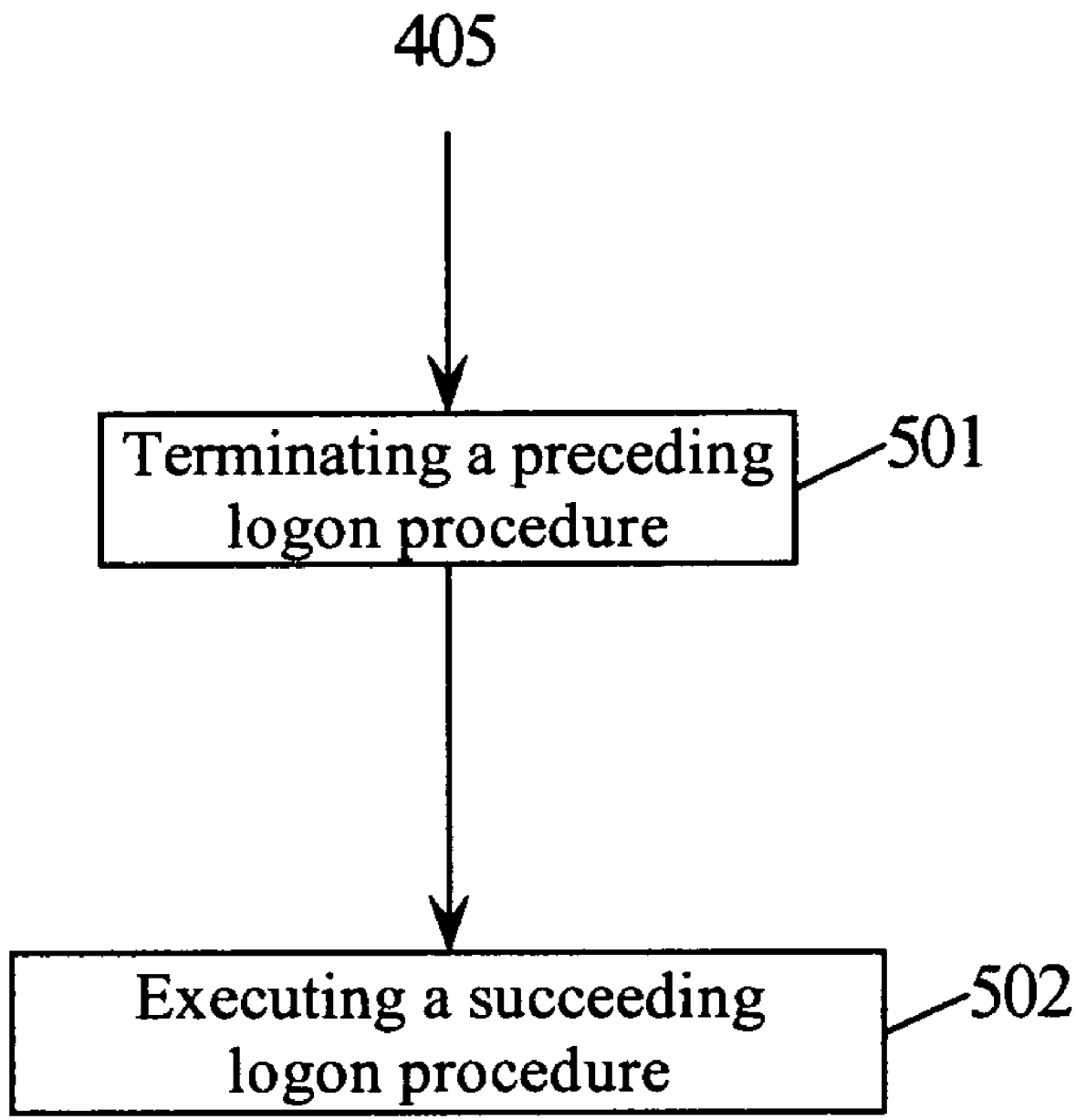
FIG. 5 is a flowchart of sub-steps of a step of attempting to establish a subsequent connection to an Internet gateway.

Step 405 may comprise sub-steps as illustrated in FIG. 5. Referring to FIG. 5, the logon procedure associated with a preceding connection, e.g., initial connection in step 401, may be terminated in step 501. In step 502, a logon procedure associated with a subsequent connection may then be executed. In the embodiment of network system 100 where one or more clients 101 are directly connected to Internet gateway 104, client 101 may be configured to execute steps 501 and 502. In the embodiment of network system 100 where network system 100 is a shared network environment as illustrated in FIG. 1, router 103 may be configured to execute steps 501 and 502. Execution of steps 501 and 502 is illustrated by the lines

":RESTART kill LOGON.EXE start LOGON.EXE"

in the script above.

Referring to step 405 in FIG. 4, upon attempting to establish a subsequent connection between client 101 and Internet gateway 104, method 400 waits for a second period of time, e.g., 60 seconds, in step 406 as illustrated by the line "sleep 60" in the script above. The second period of time, e.g., 60 seconds, may be less than the first period of time, e.g., 300 seconds. The second period of time may be less than the first period of time in order to check the status of an attempted connection in less time than in checking the status of a previously established connection.

In step 407, the status of the attempted subsequent connection between client 101 and Internet gateway 104, i.e., client 101 connected or disconnected to Internet gateway 104, is checked by issuing a request, e.g., http://www.amd.com, to Internet gateway 104 to access web server 106 utilizing a protocol, e.g., HyperText Transport Protocol (HTTP), telnet protocol, file transfer protocol, mail protocol, that is normally blocked when client 101 is logged off. An example of the issuance of a request in step 407 is illustrated by the line "httpping www.anysite.com 80" in the script above. A determination may be made in step 408 as to whether or not client 101 is connected or disconnected to Internet gateway 104. By issuing a request utilizing a protocol that is normally blocked when client 101 is logged off, the status of the subsequent connection, i.e., connected or disconnected, may be determined based on whether web server 106 may be accessed. If client 101 is logged off, i.e., client 101 is disconnected to Internet gateway 104, then the request to access web server 106 utilizing a protocol that is normally blocked when client 101 is logged off will be denied. If client 101 is logged on, i.e., client 101 is connected to Internet gateway 104, then the request to access web server 106 utilizing a protocol that is normally blocked when client 101 is logged off will be accepted. In the embodiment of network system 100 where one or more clients 101 are directly connected to Internet gateway 104, client 101 may be configured to issue a request, e.g., http://www.amd.com, to Internet gateway 104 to access web server 106 utilizing a protocol, e.g., HyperText Transport Protocol (HTTP), telnet protocol, file transfer protocol, mail protocol, that is normally blocked when client 101 is logged off. In the embodiment of network system 100 where network system 100 is a shared network environment as illustrated in FIG. 1, router 103 may be configured to issue a request, e.g., http://www.amd.com, to Internet gateway 104 to access web server 106 utilizing a protocol, e.g., HyperText Transport Protocol (HTTP), telnet protocol, file transfer protocol, mail protocol, that is normally blocked when client 101 is logged off. Router 103 may then be able to determine whether the one or more clients 101 connected to router 103 are connected or disconnected to Internet gateway 104.

As stated above, a determination may be made in step 408 as to whether client 101 is connected to Internet gateway 104. If there is a connection between client 101 and Internet gateway 104 then method 400 may wait for a first period of time, e.g., 300 seconds, in step 404, as illustrated by the line "sleep 300" in the script above, before checking the status of the connection in step 402. If there is a connection between client 101 and Internet gateway 104, the event is logged into a file storing a list of the events transpired as illustrated by the line "logevent –S i 'Broadband is re-logged on'" in the script above.

If there is not a connection between client 101 and Internet gateway 104, i.e., client 101 has become disconnected to Internet gateway 104, then an attempt to establish a subsequent connection between client 101 and Internet gateway 104 may be established automatically in step 405 as illustrated by the lines "if %ERRORLEVEL% NEQ 0 goto :RESTART
RESTART
kill LOGON.EXE
start LOGON.EXE"

in the script above.

It is noted that method 400 may be executed in a different order presented and that the order presented in the discussion of FIGS. 4 and 5 is illustrative.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A method for automatically restoring logon connectivity in a network system comprising the steps of:
   establishing a first connection between a client and an Internet gateway;
   checking status of said first connection by issuing a first request to said Internet gateway to access a web server utilizing a protocol blocked under a logged off status;
   determining whether said web server is accessed from said first request; and
   automatically attempting to establish a second connection to said Internet gateway if said web server was not accessed from said first request.

2. The method as recited in claim 1, wherein if said web server was accessed from said first request then the method further comprises the steps of:
   waiting for a first period of time; and
   checking status of said first connection by issuing a second request to said Internet gateway to access said web server utilizing said protocol blocked under said logged off status.

3. The method as recited in claim 2, wherein upon said attempting to establish said second connection to said Internet gateway the method further comprises the step of:
   waiting for a second period of time, wherein said second period of time is less than said first period of time; and
   checking status of said attempted second connection by issuing a third request to said Internet gateway to access said web server utilizing said protocol blocked under said logged off status.

4. The method as recited in claim 1, wherein said first connection is established by a first logon procedure.

5. The method as recited in claim 4, wherein said step of attempting to establish said second connection comprises the steps of
   terminating said first logon procedure; and
   executing a second logon procedure.

6. The method as recited in claim 5 further comprising the step of:
   waiting for a first period of time.

7. The method as recited in claim 6 further comprising the step of:
   checking status of said attempted second connection by issuing a second request to said Internet gateway to access said web server utilizing said protocol blocked under said logged off status.

8. The method as recited in claim 7 further comprising the step of:
   determining whether said web server is accessed from said second request.

9. The method as recited in claim 8, wherein if said web server is accessed from said second request then the method further comprises the steps of:
   waiting for a second period of time, wherein said first period of time is less than said second period of time; and
   checking status of said attempted second connection by issuing a third request to said Internet gateway to access said web server utilizing said protocol blocked under said logged off status.

10. The method as recited in claim 8, wherein if said web server was not accessed from said second request then the method further comprises the step of
    automatically attempting to establish a third connection to said Internet gateway.

11. The method as recited in claim 1, wherein said protocol is a HyperText Transport Protocol.

12. The method as recited in claim 1, wherein said protocol is a file transfer protocol.

13. The method as recited in claim 1, wherein said protocol is a telnet protocol.

14. A system, comprising:
    a processor;
    a memory unit storing a computer program operable for automatically restoring logon connectivity in a network system;

an input mechanism;
an output mechanism;
a bus system coupling the processor to the memory unit, input mechanism, and output mechanism, wherein the computer program comprises the programming steps of:
establishing a first connection between one or more clients and an Internet gateway;
checking status of said first connection by issuing a first request to said Internet gateway to access a web server utilizing a protocol blocked under a logged off status;
determining whether said web server is accessed from said first request; and
automatically attempting to establish a second connection between said one or more clients and said Internet gateway if said web server was not accessed from said first request.

15. The system as recited in claim 14, wherein if said web server was accessed from said first request then the computer program further comprises the programming steps of
waiting for a first period of time; and
checking status of said first connection by issuing a second request to said Internet gateway to access said web server utilizing said protocol blocked under said logged off status.

16. The system as recited in claim 15, wherein upon said attempting to establish said second connection between said one or more clients and said Internet gateway the computer program further comprises the programming steps of:
waiting for a second period of time, wherein said second period of time is less than said first period of time; and
checking status of said attempted second connection by issuing a third request to said Internet gateway to access said web server utilizing said protocol blocked under said logged off status.

17. The system as recited in claim 14, wherein said first connection is established by a first logon procedure.

18. The system as recited in claim 17, wherein said step of attempting to establish said second connection comprises the programming steps of:
terminating said first logon procedure; and
executing a second logon procedure.

19. The system as recited in claim 18, wherein the computer program further comprises the programming step of:
waiting for a first period of time.

20. The system as recited in claim 19, wherein the computer program further comprises the programming step of:
checking status of said attempted second connection by issuing a second request to said Internet gateway to access said web server utilizing said protocol blocked under said logged off status.

21. The system as recited in claim 20, wherein the computer program further comprises the programming step of:
determining whether said web server is accessed from said second request.

22. The system as recited in claim 21, wherein if said web server is accessed from said second request then the computer program further comprises the programming steps of:
waiting for a second period of time, wherein said first period of time is less than said second period of time; and
checking status of said attempted second connection by issuing a third request to said Internet gateway to access said web server utilizing said protocol blocked under said logged off status.

23. The system as recited in claim 21, wherein if said web server was not accessed from said second request then the computer program further comprises the programming step of
automatically attempting to establish a third connection to said Internet gateway.

24. The system as recited in claim 14, wherein said protocol is a HyperText Transport Protocol.

25. The system as recited in claim 14, wherein said protocol is a file transfer protocol.

26. The system as recited in claim 14, wherein said protocol is a telnet protocol.

27. A tangible, non-transitory storage medium having computer program logic recorded thereon for automatically restoring logon connectivity, comprising:
programming operable for establishing a first connection between a client and an Internet gateway;
programming operable for checking status of said first connection by issuing a first request to said Internet gateway to access a web server utilizing a protocol blocked under a logged off status;
programming operable for determining whether said web server is accessed from said first request; and
programming operable for automatically attempting to establish a second connection to said Internet gateway if said web server was not accessed from said first request.

28. The tangible, non-transitory storage medium as recited in claim 27, wherein if said web server was accessed from said first request then the computer program product further comprises:
programming operable for waiting for a first period of time; and
programming operable for checking status of said first connection by issuing a second request to said Internet gateway to access said web server utilizing said protocol blocked under said logged off status.

29. The tangible, non-transitory storage medium as recited in claim 28, wherein upon said attempting to establish said second connection to said Internet gateway the computer program product further comprises:
programming operable for waiting for a second period of time, wherein said second period of time is less than said first period of time; and
programming operable for checking status of said attempted second connection by issuing a third request to said Internet gateway to access said web server utilizing said protocol blocked under said logged off status.

30. The tangible, non-transitory storage medium as recited in claim 27, wherein said first connection is established by a first logon procedure.

31. The tangible, non-transitory storage medium as recited in claim 30, wherein said programming step of attempting to establish said second connection comprises the programming steps of
terminating said first logon procedure; and
executing a second logon procedure.

32. The tangible, non-transitory storage medium as recited in claim 31 further comprising:
programming operable for waiting for a first period of time.

33. The tangible, non-transitory storage medium as recited in claim 32 further comprising:
programming operable for checking status of said attempted second connection by issuing a second request to said Internet gateway to access said web server utilizing said protocol blocked under said logged off status.

34. The tangible, non-transitory storage medium recited in claim 33 further comprising:
programming operable for determining whether said web server is accessed from said second request.

35. The tangible, non-transitory storage medium as recited in claim 34, wherein if said web server is accessed from said second request then the computer program product further comprises:
   programming operable for waiting for a second period of time, wherein said first period of time is less than said second period of time; and
   programming operable for checking status of said attempted second connection by issuing a third request to said Internet gateway to access said web server utilizing said protocol blocked under said logged off status.

36. The tangible, non-transitory storage medium as recited in claim 34, wherein if said web server was not accessed from said second request then the computer program product further comprises:
   programming operable for automatically attempting to establish a third connection to said Internet gateway.

37. The tangible, non-transitory storage medium as recited in claim 27, wherein said protocol is a HyperText Transport Protocol.

38. The tangible, non-transitory storage medium as recited in claim 27, wherein said protocol is a file transfer protocol.

39. The tangible, non-transitory storage medium as recited in claim 27, wherein said protocol is a telnet protocol.

* * * * *